(12) United States Patent
Hegde

(10) Patent No.: US 11,172,024 B2
(45) Date of Patent: Nov. 9, 2021

(54) CO-LOCATION OF STORAGE BUCKETS WITH CONTAINERIZED APPLICATIONS

(71) Applicant: INTERNATIONAL BUSINESS MACHINES CORPORATION, Armonk, NY (US)

(72) Inventor: Harsha Hegde, Buffalo Grove, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/826,979

(22) Filed: Mar. 23, 2020

(65) Prior Publication Data
US 2021/0297487 A1 Sep. 23, 2021

(51) Int. Cl.
H04L 29/08 (2006.01)
G06F 9/54 (2006.01)
H04L 29/06 (2006.01)

(52) U.S. Cl.
CPC ............ *H04L 67/1097* (2013.01); *G06F 9/54* (2013.01); *H04L 29/06047* (2013.01); *H04L 29/08963* (2013.01); *H04L 67/1021* (2013.01); *H04L 67/325* (2013.01); *H04L 67/42* (2013.01)

(58) Field of Classification Search
None
See application file for complete search history.

(56) References Cited

U.S. PATENT DOCUMENTS 9,087,154 B1* 7/2015 Seibert, Jr. .......... G06F 11/3612
9,817,584 B2* 11/2017 Chen ..................... G06F 3/067
2014/0101271 A1* 4/2014 Fan ........................ H04L 51/32 709/206
2016/0357451 A1* 12/2016 Chen ..................... G06F 3/067
2017/0344292 A1* 11/2017 Sterin ................... G06F 3/0608
2018/0276019 A1* 9/2018 Ali ....................... G06F 16/2365

(Continued)

FOREIGN PATENT DOCUMENTS

KR 101987668 6/2019

OTHER PUBLICATIONS

Huawei Technologies Co., Ltd, "Cloud Container Engine", https://support.huaweicloud.com/intl/en-us/usermanual-cce/cce-usermanual.pdf, Mar. 18, 2020, 493 pages.

(Continued)

*Primary Examiner* — Lance Leonard Barry
(74) *Attorney, Agent, or Firm* — Anthony England; Andrew D. Wright; Roberts Calderon Safran & Cole, P.C.

(57) ABSTRACT

A system and method for co-locating a containerized application and an associated cloud storage bucket are provided. In embodiments, a method includes determining, by a computing device, a location of a containerized application in a data storage network; determining, by the computing device, that a cloud storage bucket does not yet exist in a geographic zone associated with the location of the containerized application; selecting, by the computing device, a data storage location for the cloud storage bucket from a plurality of data storage locations in the data storage network based on the geographic zone; and sending, by the computing device, a request to create the cloud storage bucket to the data storage location and causing creation and co-location of the cloud storage bucket within a predetermined distance of the containerized application.

16 Claims, 7 Drawing Sheets

(56) References Cited

U.S. PATENT DOCUMENTS

2019/0294425 A1* 9/2019 Holman .................. G06F 8/60
2019/0327272 A1 10/2019 Narayanaswamy
2020/0371857 A1* 11/2020 Guha .................. G06F 9/5072

OTHER PUBLICATIONS

Mell et al., "The NIST Definition of Cloud Computing", NIST, Special Publication 800-145, Sep. 2011, 7 pages.
Anoymous, "What is a Container? A standardized unit of software", https://www.docker.com/resources/what-container, acessed Feb. 16, 2020, 5 pages.
Anonymous, "What is Kubernetes?", accessed Feb. 16, 2020, 17 pages.
Anonymous, "IBM Cloud Paks", https://www.ibm.com/cloud/paks/, IBM, accessed Feb. 16, 2020, 13 pages.

* cited by examiner

US 11,172,024 B2

CO-LOCATION OF STORAGE BUCKETS WITH CONTAINERIZED APPLICATIONS

BACKGROUND

Aspects of the present invention relate generally to data storage systems and, more particularly, to co-location of cloud storage buckets with containerized applications.

A container is a standard unit of software that packages up code and all its dependencies (e.g., libraries or other required resources) so a software application runs quickly and reliably from one computing environment to another. Containers isolate software from its environment and ensure that it works uniformly despite differences for instance between development and staging environments. One example of containerization software is Docker®, a registered trademark of Docker, Inc. Corp., which is an open source software tool for packaging and distributing containerized applications.

Containerized applications (e.g. applications using Docker® containers) may be created within a pod and a node in a multi-node cluster environment. One example of a software tool for managing containerized applications in a multi-node cluster environment is Kubernetes®. More specifically, Kubernetes®, a registered trademark of Google Inc. Corp., is an open-source orchestration software for deploying, managing, and scaling containers. Kubernetes® provides an open source application program interface (API) that controls how and where containers will run. Containers are grouped into pods, as the basic operational unit for Kubernetes®. Kubernetes® is configured to orchestrate and manage the distributed, containerized applications that Docker® creates. Kubernetes® also provides infrastructure to deploy and run those applications on a cluster of machines (e.g., Kubernetes® environment), wherein each machine in a cluster is a node.

The container-based applications discussed above require access to data storage via emptyDir and persistent volumes (e.g., local disks or through network file systems). An emptyDir volume is first created when a pod is assigned to a node, and exists as long as that pod is running on that node. The emptyDir volume is initially empty. Containers in the pod can all read and write the same files in the emptyDir volume, though that volume can be mounted at the same or different paths in each container. When a pod is removed from a node for any reason, the data in the emptyDir is deleted forever.

SUMMARY

In a first aspect of the invention, there is a computer-implemented method including: determining, by a computing device, a location of a containerized application in a data storage network; determining, by the computing device, that a cloud storage bucket does not yet exist in a geographic zone associated with the location of the containerized application; selecting, by the computing device, a data storage location for the cloud storage bucket from a plurality of data storage locations in the data storage network based on the geographic zone; and sending, by the computing device, a request to create the cloud storage bucket to the data storage location and causing creation and co-location of the cloud storage bucket within a predetermined distance of the containerized application.

In another aspect of the invention, there is a computer program product including one or more computer readable storage media having program instructions collectively stored on the one or more computer readable storage media. The program instructions are executable to: determine a location of a cloud storage bucket at a start time of a containerized application; select a geographic zone from a multi-zone region of a data storage network based on the location; and initiate the creation of the containerized application on a node in the geographic zone of the data storage network.

In another aspect of the invention, there is system including a processor, a computer readable memory, one or more computer readable storage media, and program instructions collectively stored on the one or more computer readable storage media. The program instructions are executable to: determine a location of a containerized application in a data storage network; determine that a cloud storage bucket does not yet exist in a geographic zone associated with the location of the containerized application; select a data storage location for the cloud storage bucket from a plurality of data storage locations in the data storage network based on the geographic zone; and send a request to create the cloud storage bucket to the data storage location and causing the creation and co-location of the cloud storage bucket within a predetermined distance of the containerized application, wherein the request includes instructions for automatically enabling features or functions associated with a type of the containerized application.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
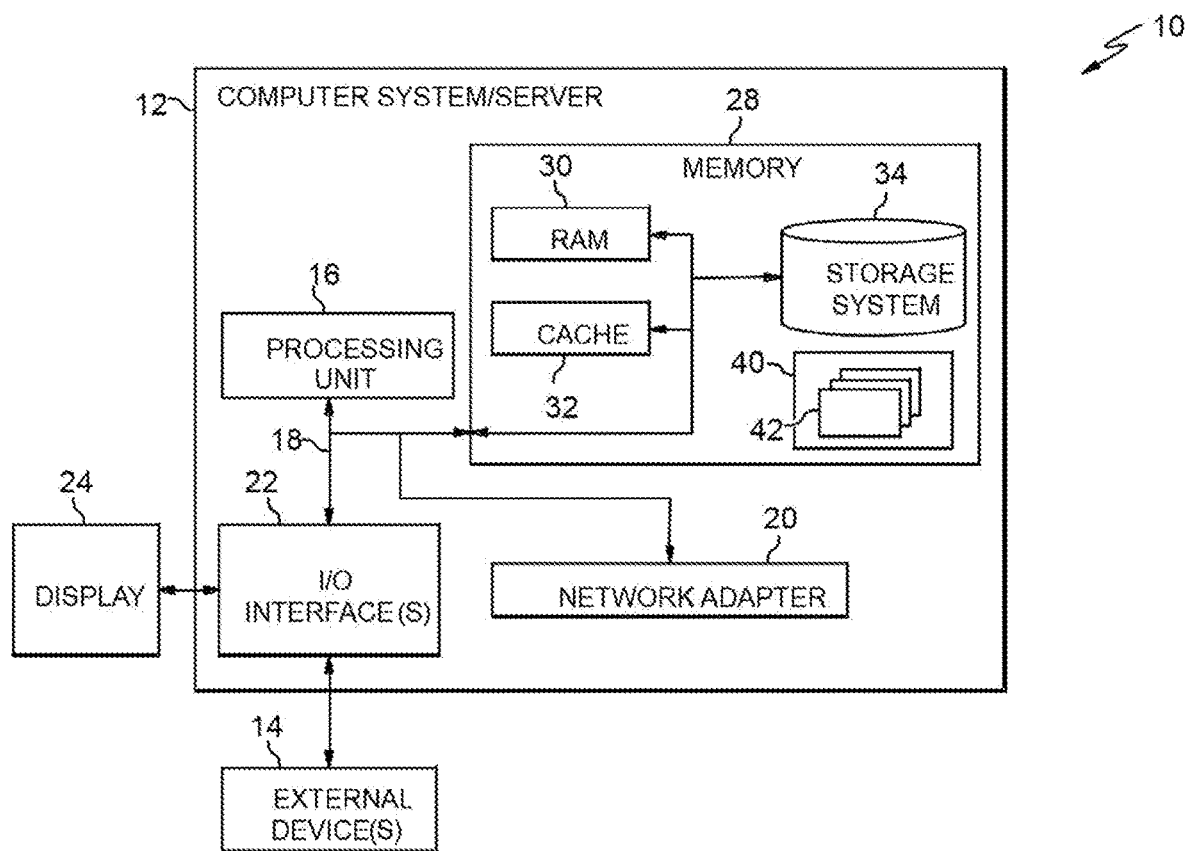
FIG. 1 depicts a cloud computing node according to an embodiment of the present invention.

Aspects of the present invention relate generally to data storage systems and, more particularly, to co-location of cloud storage buckets with containerized applications. In embodiments, systems and methods are provided to co-locate cloud storage buckets (also referred to as object storage buckets or buckets herein) with associated containerized applications within the same geographic zone or location. The term co-locate as used herein refers to the location of a cloud storage bucket at or near (e.g., within a predetermined distance of) the location of an associated containerized application. Embodiments of the invention further initiate automatic enablement of storage features at a cloud storage bucket based on a type of an associated containerized application or its data. By enabling data resources (cloud storage buckets) to be close to compute resources (nodes), and by enabling features protecting data based on the type of the containerized application and/or its data, embodiments of the invention enhance performance and security of containerized applications.

In implementations, emptyDir and persistent volumes in cloud object storage (private or public) to be used by the containerized applications are mapped to object storage buckets. In embodiments, these object storage buckets are automatically initially created near (e.g., within a predetermined distance of) a pod and node where the containerized applications are running, or the containerized applications are automatically moved near (e.g., within a predetermined distance of) the object storage bucket location.

In aspects, if an object storage bucket that is backing a persistent volume is not yet created, then the object storage bucket is created closer to the location of the application in one of two ways: (1) middleware (e.g. IBM CloudPak™) creates the buckets in private or public cloud object storage in the same multi-zone regions (MZR) where the containerized application is running (through a service broker); or (2) the access layer in an object storage device creates the buckets using an appropriate location constraint based on the origination of a request to create a bucket.

In implementations, if an object storage bucket that is backing a persistent volume already exists, then a containerized application is created or moved to the bucket location if it is not already there. In aspects, middleware determines a location of a persistent volume in public cloud storage (region, datacenter etc.) and places a container instance in the same location at container create/start time, or moves the container to the same location as the storage volume. Implementations of the invention allow data and compute resources to be close to each other, which improves performance for containerized applications by reducing latency for data access with the applications.

In embodiments, middleware of the invention is provisioned with a definitions file including types of containerized applications or data that are being handled by containers. For example, a type of data may be legal data, finance data, health data, or other vertical related data. In embodiments, middleware automatically triggers internet protocol (IP) whitelisting, and data life cycle (such as retention, archive etc.) based on the application type that is running in the container. In aspects, these features are enabled for the object storage bucket, with no application intervention or awareness, during creation of the bucket or at the time of container creation. Such a feature allows the data to be secured, the data of the application to be protected from exposure to hackers, and the data to be protected based on needs of the particular containerized application.

Typically, container-based applications in a multi-node environment require access to data storage via emptyDir and persistent volumes (e.g., local disks or through network file systems). In general, storage volumes created in cloud storage (such as an object storage bucket) are assumed to be local and pre-created, and the expectation is that a containerized application is aware of the location of volumes backed by remote storage (e.g., buckets) in the cloud. When the compute resources for the containerized application and stored data are not in the same geographic region or data center, and the containerized application is responsible for managing the underlying remote storage (e.g., cloud buckets), an additional burden on the containerized application and potential inefficiencies are introduced. In addition, the containerized applications will be responsible for managing all metadata associated with the cloud storage, as well as managing security for the data.

Embodiments of the invention provide a technical solution to the technical problem of cloud storage management by providing a system and method for co-locating containerized applications and storage volumes. In implementations, a method for creating object storage buckets to support a containerized application in a cloud object storage system comprises: determining a location of a node and a pod on which the containerized application is running; at volume create time, setting the location constraint for a PUT bucket request to match the multi-zone region (MZR) where the containerized application is running; determining a source of the client request through an originating client Internet Protocol (IP) address via the access layer in the object storage system; determining the MZR of the client request; and proxying the PUT bucket request to the correct endpoint of the cloud object storage system in order to create a bucket in the same MZR as that of the client.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
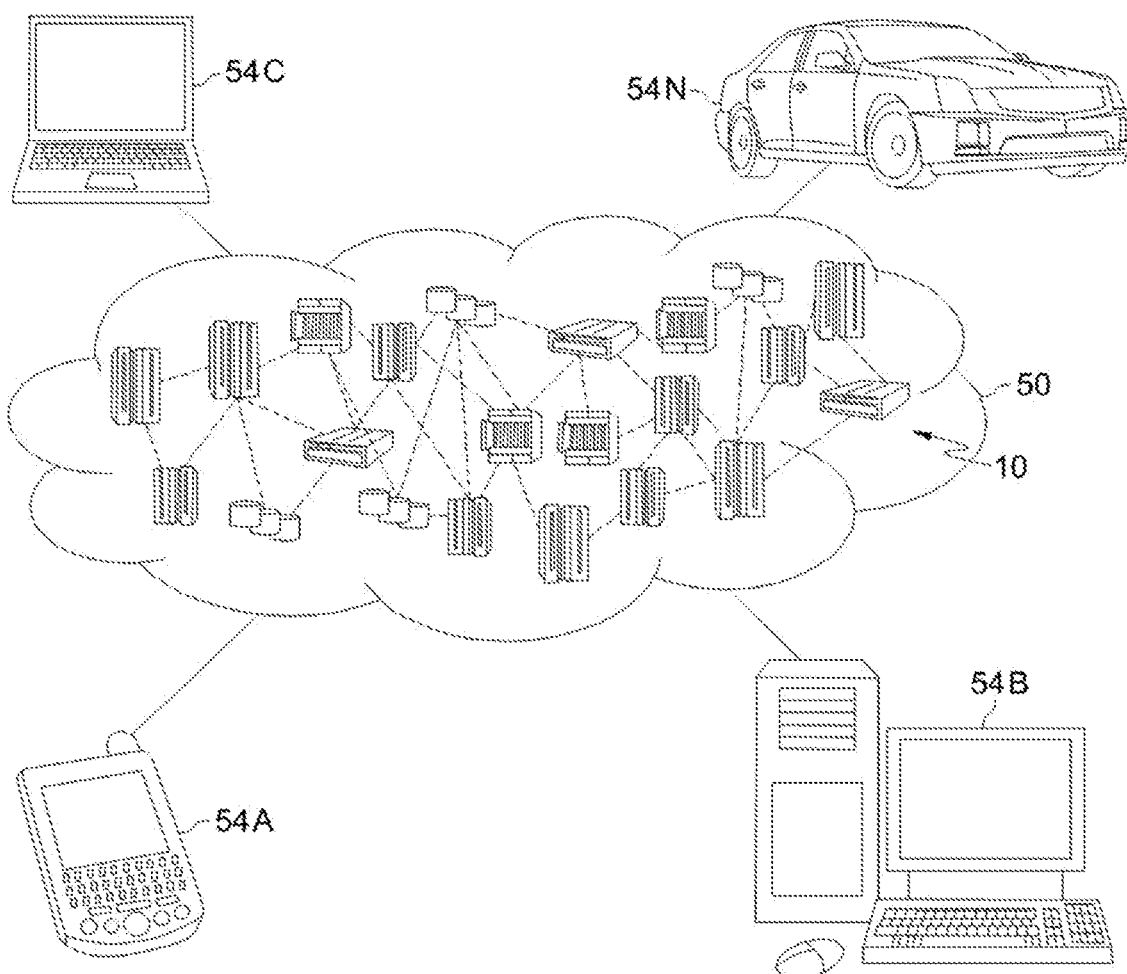
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
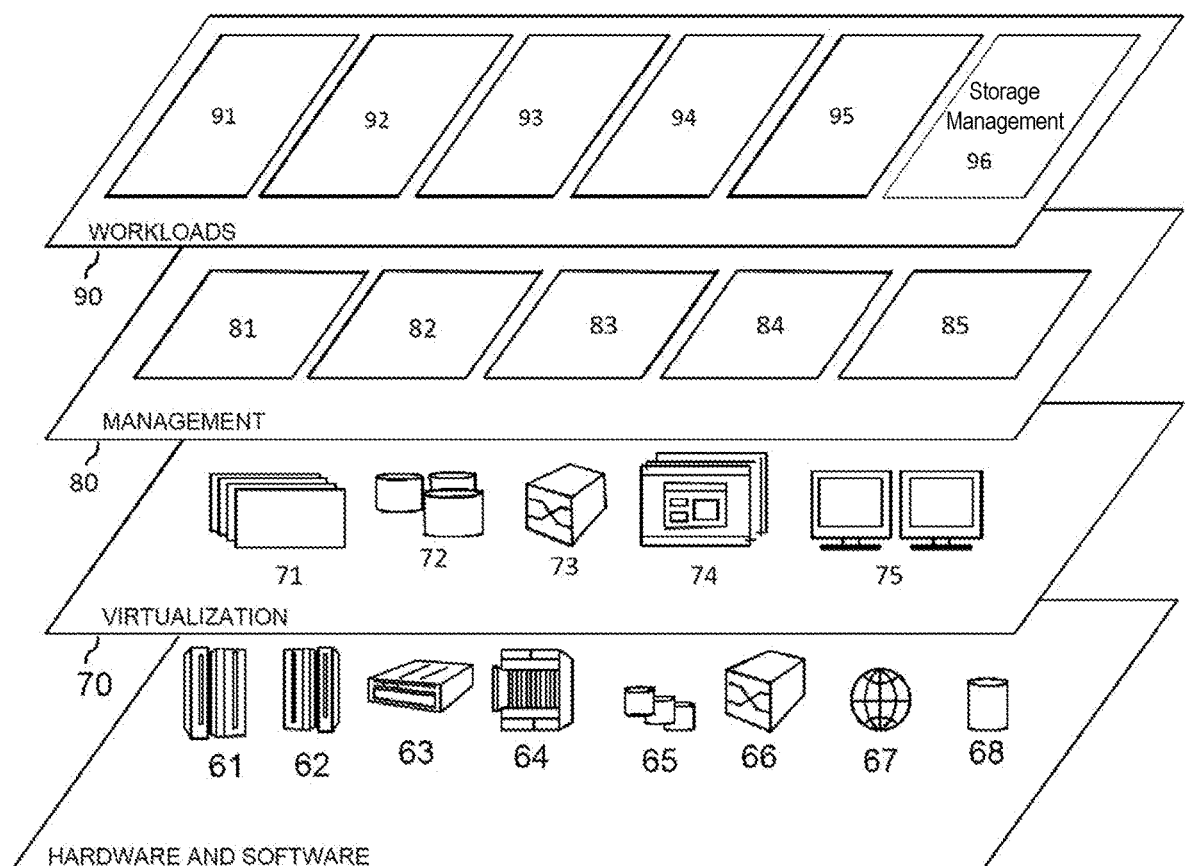
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage management 96.

Implementations of the invention may include a computer system/server 12 of FIG. 1 in which one or more of the program modules 42 are configured to perform (or cause the computer system/server 12 to perform) one of more functions of the storage management 96 of FIG. 3. For example, the one or more of the program modules 42 may be configured to: determine a location of a node and a pod on which a containerized application is running; determine a zone (zone of interest) of a multi-zone region that is associated with the location; set a location constraint for a request to create a cloud storage bucket; determine a type of the containerized application (e.g., a legal application); determine features or functions associated with the type of containerized application or its data; determine a cloud storage bucket does not yet exist at the zone of interest; select a data storage location based on the zone; and create the cloud storage bucket at the data storage location. In implementations, the storage management 96 determines a location of an existing cloud storage bucket and initiates the creation of a containerized application within a zone of interest at or near the location of the cloud storage bucket. In implementations, the storage management 96 moves the location of a containerized application to a location (zone of interest) at or near the location where a containerized application is running.

Figure 4:
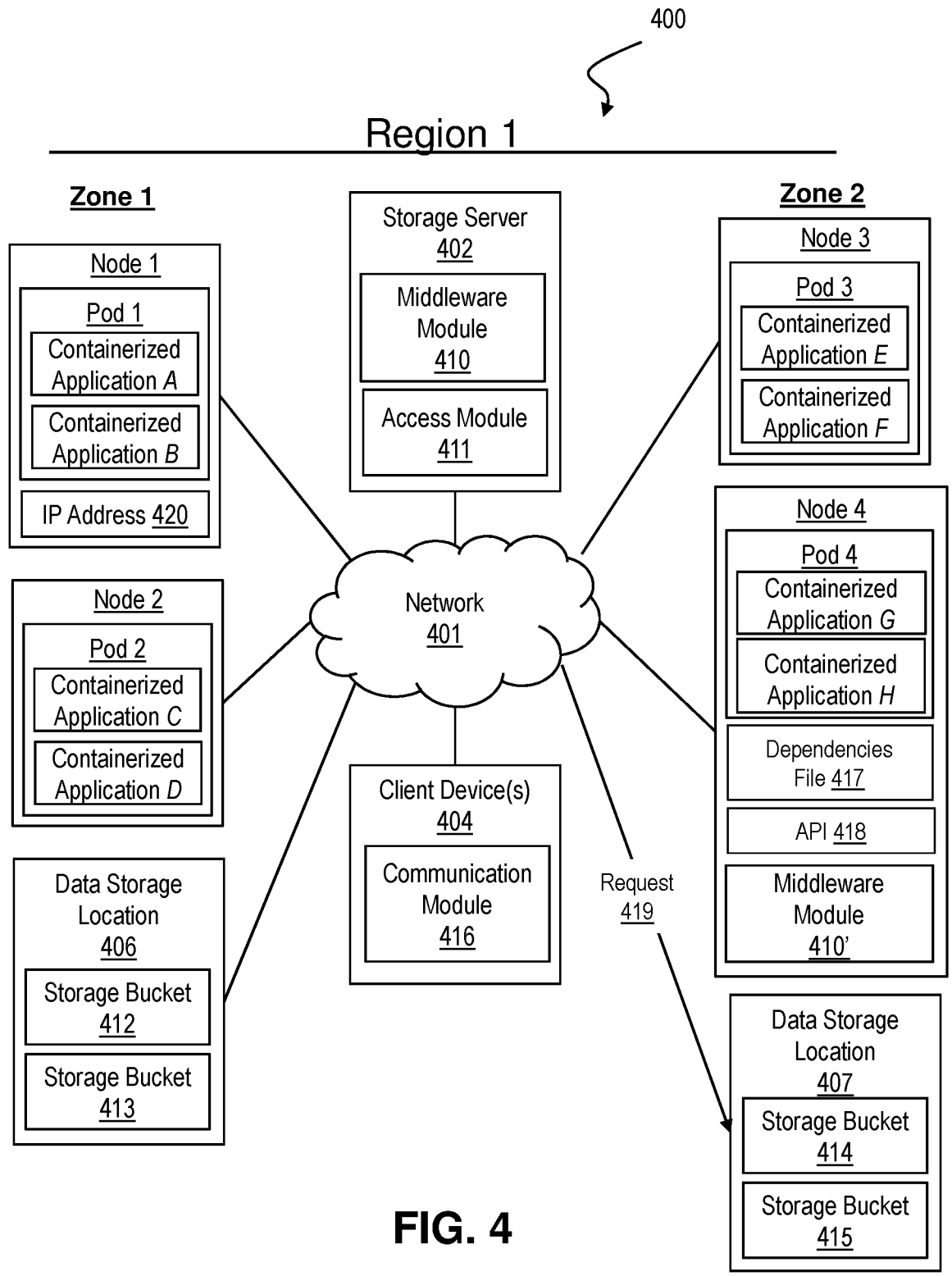
FIG. 4 shows a block diagram of an exemplary environment in accordance with aspects of the invention.

FIG. 4 shows a block diagram of an exemplary data storage environment 400 in accordance with aspects of the invention. In embodiments, the environment 400 includes a network 401 connecting a storage server 402 with one or more client devices 404, a plurality of data storage locations represented by data storage locations 406 and 407, and a plurality of storage nodes represented by Nodes 1-4 in FIG. 4. In implementations, the storage server 402, the client devices 404, the data storage locations 406 and 407, and the storage Nodes 1-4 may each include components of the computer system 12 of FIG. 1. The one or more client devices 404 may be desktop computers, laptop computers, tablets, smartphones, or other personal computing devices. In embodiments, the storage server 402 is a special purpose computing device configured to provide cloud-based data storage management services to a plurality of clients. In implementations, the Nodes 1-4 comprise special purpose computing devices configured to store data in a distributed storage network environment, wherein information is stored on more than one node (e.g., in a replicated fashion).

In embodiments, the environment 400 includes computing devices spread over one or more geographic regions (multi-zone regions), wherein each region is further divided into location-based zones (geographic zones). In the example of FIG. 4, a Region 1 comprises a Zone 1 and a Zone 2, wherein Nodes 1 and 2 and data storage location 406 are located within Zone 1, and wherein Nodes 3 and 4 and data storage location 407 are located within Zone 2. A zone of the present invention can be defined by a system administrator or user, and can be any desired size. In one example, the size and geographic locations of Zones 1 and 2 are defined by an administrator of the environment 400.

The network 401 may be any suitable communication network or combination of networks, such as a local area network (LAN), a general wide area network (WAN), and/or a public network (e.g., the Internet). The devices of FIG. 4 (the storage server 402, the client devices 404, the data storage locations 406 and 407, and the Nodes 1-4) may each constitute one of the cloud computing nodes 10 of the cloud computing environment 50 of FIG. 2. In embodiments, each of the Nodes 1-4 includes at least one pod (e.g., respective Pods 1-4) housing one or more containerized applications (e.g., containerized applications A-H). The term containerized application, as used herein, refers to a software application that is encapsulated in a container, which is a standard unit of software that packages up code and all its dependencies so the software application runs quickly and reliably from one computing environment to another.

Devices of FIG. 4 (the storage server 402, the client devices 404, the data storage locations 406 and 407, and the Nodes 1-4) may each include one or more program modules (e.g., program module 42 of FIG. 1) executed by the respective devices and configured to perform one or more functions described herein. In embodiments, the storage server 402 includes one or more of the following: a middleware module 410 (middleware layer), and an access module 411 (access layer). In implementations, the middleware module 410 is configured to: determine a location of a node and a pod on which a containerized application is running; determine a zone associated with the location; set a location constraint on a request to create a cloud storage bucket based on the zone; determine a type of the containerized application and its data; determines feature or functions associated with the type of the containerized application; determine a cloud storage bucket does not yet exist in the zone; select a data storage location in the zone; and generate and send a request to create the cloud storage bucket to the select data storage location, wherein the request includes instructions to automatically initiate the features or functions associated with the type of the containerized application. While the middleware module 410 is depicted as being utilized by the storage server 402, in embodiments, a middleware module of the present invention may be located at one of the Nodes 1-4 in the environment 400, as represented by the middleware module 410' at the Node 4.

In embodiments, the access module 411 (access layer) is configured to: receive a request to create a cloud storage bucket; determine a location of a source of the request; determine a zone associated with the location; determine a cloud storage bucket does not yet exist in the zone; select a data storage location based on the zone; and send a request to create the cloud storage bucket in the zone to the select data storage location.

In aspects, the data storage locations 406 and 407 comprise computing devices configured to store data within a plurality of cloud storage buckets (e.g., storage buckets 412-415). The term storage bucket (also referred to as a cloud storage bucket and an object storage bucket) as used herein refers to a basic container that holds data. In general, storage buckets are utilized to organize data and control access to the data in a storage network. In embodiments, some or all data stored in a cloud storage environment are contained in storage buckets.

In implementations, client devices 404 may communicate with the one or more of the other devices of FIG. 4 (e.g., the storage server 402, the data storage locations 406 and 407 and the Nodes 1-4) via a communication module 416 to manage the storage of data from the client devices 404 within the environment 400.

The devices of FIG. 4 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
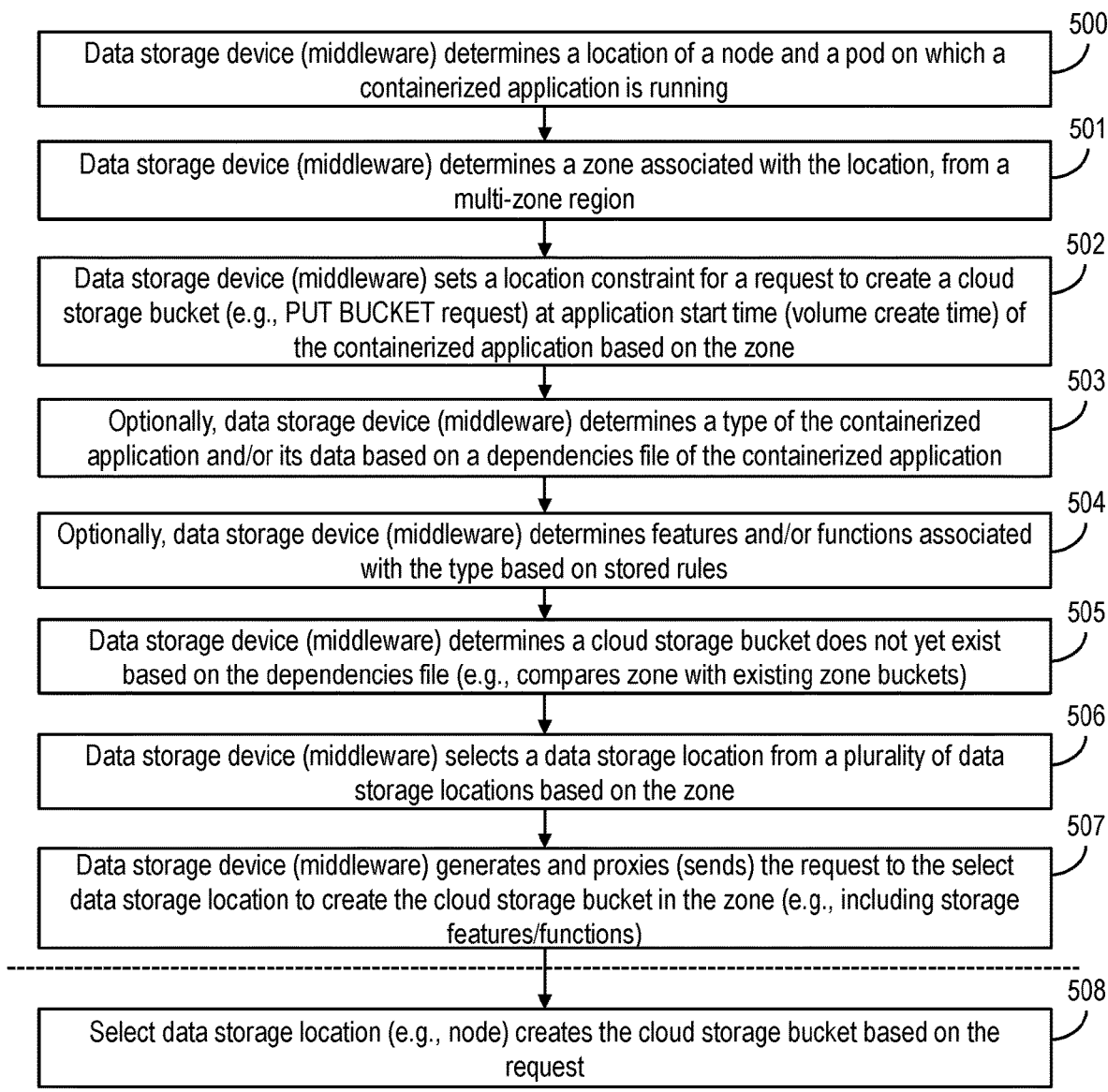
FIG. 5 shows a flowchart of an exemplary method for co-locating a storage bucket with a containerized application in accordance with aspects of the invention.

FIG. 5 shows a flowchart of an exemplary method for co-locating a storage bucket with a containerized application in accordance with aspects of the invention. Steps of the method may be carried out in the environment of FIG. 4 and are described with reference to elements depicted in FIG. 4.

At step 500, a data storage device of the environment 400 determines a location (e.g., geographic location) of a node and a pod (e.g., Node 1, Pod 1) on which a containerized application (e.g., containerized application A) is running. In embodiments, the data storage device of step 500 is the storage server 402. In other embodiments, the data storage device of step 500 is a node of the environment 400 housing one or more containerized applications (e.g., Node 4). The term node as used herein refers to a computing device on the network 401 configured to store data. The term pod as used herein refers to a group of one or more containers for housing containerized applications. In embodiments, the data storage device determines the location of the node and the pod at volume create time (e.g., each time the container starts after a delete for emptyDir, or for the first time only in the case of a persistent volume). In implementations, the data storage device determines the location of the node and the pod based on location data obtained from the containerized application. In embodiments, the middleware module 410 or 410' implements step 500. In implementations, a middleware layer (e.g., middleware module 410 or 410') works with a container layer (e.g., Kubernetes® with Docker® on Node 1) to start a containerized application (e.g., containerized application A). In aspects, the container layer includes information regarding what is needed for the containerized application to run, including data needed (e.g., dependencies identified through a dependencies file), and the computer cluster and topology information to determine where the containerized application can run (e.g., the Kubernetes® cluster, node and pod topology and information). In implementations, the middleware layer includes a definitions file that enables user to define a type of a containerized application (e.g., a legal application requiring retention compliance). In embodiments, the middleware layer accesses the dependencies file (e.g., dependencies file 417) of the container layer, and queries for a location of data using a GET BUCKET LOCATION API (e.g., API 418) based on the information in the dependencies file for the data volume. The term dependencies file as used herein refers to a file used to track or compile dependencies for files in the containerized application. In other embodiments, the middleware layer obtains a location from the dependencies file itself, wherein the dependencies file includes a location for each storage volume specified.

At step 501, the data storage device of the environment 400 (e.g., the storage server 402 or the Node 4) determines a zone (e.g., a predetermined geographic zone) associated with the location determined at step 500. In embodiments, the data storage device determines which zone of a multi-zone region (geographic region) most closely matches the location based on stored location data regarding the zones. For example, the data storage device may determine that a containerized application in a particular building in a city most closely matches a geographic zone that includes that city in a region (e.g., a state) based on stored location data. In embodiments, the middleware module 410 or 410' implements step 501.

At step 502, the data storage device of the environment 400 (e.g., the storage server 402 or the Node 4) sets a location constraint for a request to create a cloud storage bucket (e.g., a PUT Bucket request) at an application start time of the containerized application, based on the zone determined at step 501. Tools and methods for setting a location constraint for a PUT Bucket request or the like may be utilized by the data storage device to implement step 502. In one example, a containerized application A is running in a region "US-EAST", and a location constraint in a PUT Bucket request utilizes US-EAST for its region. Such a request results in a cloud storage bucket being created in the same multi-zone region (MZR) where the containerized application is running. All object uploads and downloads for the cloud storage bucket of this example would be local to the same MZR where the containerized application A is running. In embodiments, the cloud storage bucket and its associated containerized application are co-located within a predetermined distance (threshold distance) of one another. In embodiments, the middleware module 410 or 410' implements step 502.

At step 503, the data storage device of the environment 400 (e.g., the storage server 402 or the Node 4) optionally determines a type of the containerized application and/or its data based on a dependencies file of the containerized application. In embodiments, the dependency file may be a chart, such a chart generated by Helm™, which is a collection of files that describe a related set of Kubernetes® resources. In embodiments, the middleware module 410 or 410' implements step 503.

At step 504, the data storage device of the environment 400 (e.g., the storage server 402 or the Node 4) optionally determines features and/or functions associated with the type of containerized application and/or its data determined at step 503. In embodiments, the data storage device utilized stored rules associating various types of containerized applications and/or their type(s) of data with various features and/or functions to determine the features and/or functions for a particular type of containerized application or its data. In one example, the data storage device determines at step 503 that a containerized application comprises legal software, and based on the type "legal software" the data storage device further determines at step 504 that a write once, read many (WORM) storage feature is associated with the type "legal software". In general, WORM storage enables business to lock down records to ensure that no unauthorized changes have been made (e.g., the data cannot be deleted). In embodiments, the middleware module 410 or 410' implements step 504.

At step 505, the data storage device of the environment 400 (e.g., the storage server 402 or the Node 4) determines that a cloud storage bucket does not yet exist for the zone determined at step 501 (or the location constraint of step 502), based on the dependencies file of the containerized application. In embodiments, the data storage device compares the zone where a storage bucket is desired (zone of interest determined at step 501) to the zones in the dependencies file in which cloud storage buckets are listed as already existing to determine if the zone of interest matches one of the zones/cloud storage buckets listed in the dependencies file. If there is a match between the zone of interest and the listed zones/cloud storage buckets, the data storage device can initiate data storage at the existing cloud storage bucket(s) in the zone of interest. If there is no match between the zone of interest and the listed zones/cloud storage buckets, the data storage device proceeds with step 506. In embodiments, the middleware module 410 or 410' implements step 505.

At step 506, the data storage device of the environment 400 (e.g., the storage server 402 or the Node 4) selects a data storage location (e.g., data storage location 406 or data storage location 407) from a plurality of data storage locations in the environment 400 based on the zone of interest determined at step 501. In embodiments, the data storage device selects the data storage location based on how close the data storage location is to the zone of interest. In one example, the zone of interest is Zone 1 of FIG. 4, and the data storage location selected at step 506 is the data storage location 406 within Zone 1. In another example, the zone of interest is Zone 2 of FIG. 4, and the data storage location selected at step 506 is the data storage location 407 within Zone 2. While only one data storage location is depicted in each zone in FIG. 4, it should be understood that multiple storage locations can be located within each zone. In embodiments, the middleware module 410 or 410' implements step 506.

At step 507, the data storage device of the environment 400 (e.g., the storage server 402 or the Node 4) proxies (sends) the request to create a cloud storage bucket (e.g., request 419) to the data storage location selected at step 506. In embodiments, the request to create the cloud storage bucket includes instructions for automatically initiating the storage features or functions determined at step 504. In implementations, based on the type of data a containerized application is handling, the data storage device triggers one or more of the following to enable features on an object storage bucket in order to secure and protect the data: (1) Internet Protocol (IP) white listing for the cloud storage bucket with either the container IP address only or a list of provisioned addresses (e.g., including other services that can interact); (2) write once and read only storage (e.g., for financial data); retention of data forever (e.g., for legal data); or (4) active tracker for sensitive applications handling other sensitive data. In embodiments, the middleware module 410 or 410' implements step 507.

At step 508, the select data storage location creates the cloud storage bucket based on the request received from the data storage device (e.g., the middleware module 410 or 410'). Tools and methods for creating cloud storage buckets may be utilized by the data storage location(s) based on the request. In embodiments, the creation of the cloud storage bucket includes the automatic initiation of the features or functions determined at step 504 (e.g., turning on WORM storage features for legal data). In embodiments, the data storage locations 406 or 407 implement step 508.

Figure 6:
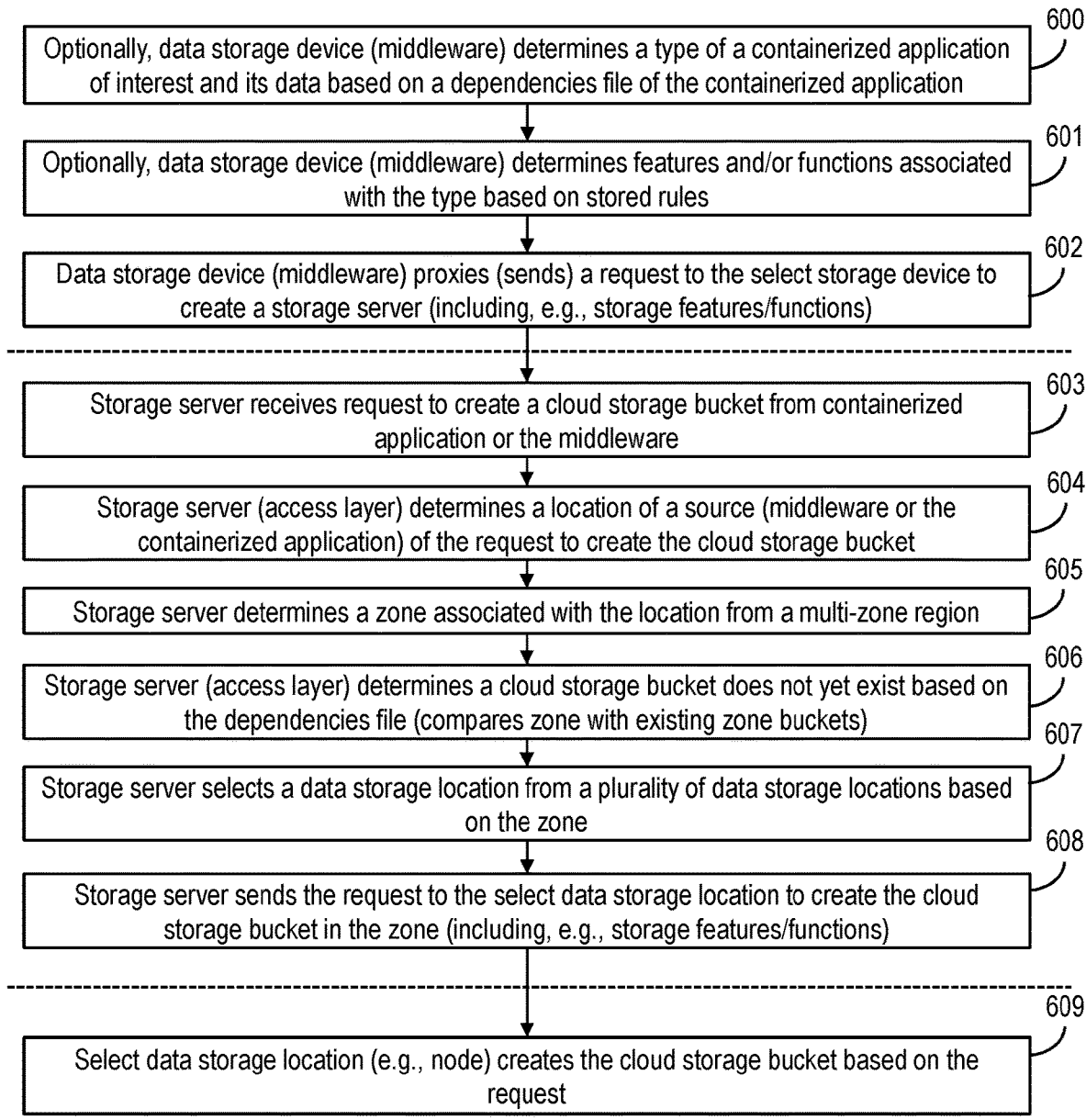
FIG. 6 shows a flowchart of another exemplary method for co-locating a storage bucket with a containerized application in accordance with aspects of the present invention.

FIG. 6 shows a flowchart of another exemplary method of co-locating a storage bucket with a containerized application in accordance with aspects of the present invention. Steps of the method may be carried out in the environment of FIG. 4 and are described with reference to elements depicted in FIG. 4.

Optionally, at step 600, the data storage device of the environment 400 (e.g., the storage server 402 or the Node 4) determines a type of a containerized application of interest and/or its data from a dependencies file of the containerized application. Step 600 may be implemented in the same manner as step 503 of FIG. 5. Step 600 may be implemented at startup of the containerized application of interest (e.g., containerized application A). In embodiments, the middleware module 410 or 410' implements step 600.

Optionally, at step 601, the data storage device of the environment 400 (e.g., the storage server 402 or the Node 4) determines features and/or functions associated with the type of containerized application and/or its data determined at step 600. Step 601 may be implemented in the same manner as step 504 of FIG. 5. In embodiments, the middleware module 410 or 410' implements step 601.

Optionally, at step 602, the data storage device of the environment 400 (e.g., the storage server 402 or the Node 4) sends a request to create a cloud storage bucket to a storage server 402 of the environment 400. In embodiments, the request to create the cloud storage bucket includes instructions for initiating the storage features or functions determined at step 601. For example, the request may include instructions to turn on WORM storage features for legal data. In embodiments, the middleware module 410 or 410' implements step 602.

At step 603, the storage server 402 receives the request (original request) to create a cloud storage bucket. In embodiments, the storage server 402 receives the request from local middleware 410 or from the middleware 410' of a node (e.g., Node 4). In embodiments, the storage server 402 receives the request from a containerized application (e.g., containerized application A). In embodiments, the access module (access layer) 411 of the storage server 402 receives the request in accordance with step 603.

At step 604, the storage server 402 determines a location of a source of the request to create the cloud storage bucket. In implementations, the storage server 402 determines the source of the request through the originating client IP address (e.g., IP Address 420) of the request. In one example, a request is received from a container pod IP address of 10.x.x.x, and the storage server 402 maps the IP address to a specific region (e.g., US-EAST) based on stored rules (e.g., a list of IP addresses and associated geographic locations/regions/zones). In embodiments, the access module 411 of the storage server 402 implements step 604.

At step 605, the storage server 402 determines a zone (zone of interest) associated with the location determined at step 604 from a plurality of zones of a MZR based on stored location data. In embodiments, the storage server 402 determines which zone of a multi-zone region most closely matches the location of the source of the request based on stored location data regarding the zones. In embodiments, the zone of interest is determined such that the cloud storage bucket and its associated containerized application are co-located within a predetermined or threshold distance of one another. In embodiments, the access module 411 of the storage server 402 implements step 605.

At step 606, the storage server 402 determines that a cloud storage bucket does not yet exist for the zone determined at step 605, based on the dependencies file of the containerized application of interest. In embodiments, the storage server 402 compares the zone where a cloud storage bucket is desired (zone of interest determined at step 605) to the zones in the dependencies file in which cloud storage buckets are listed as already existing to determine if the zone of interest matches one of the zones/cloud storage buckets listed in the dependencies file. If there is a match between the zone of interest and the listed zones/cloud storage buckets, the data server 402 can initiate storage at the existing cloud storage bucket in the zone of interest. If there is no match between the zone of interest and the listed zones/cloud storage buckets, the storage server 402 proceeds to step 607. In embodiments, the access module 411 of the storage server 402 implements step 606.

At step 607, the storage server 402 selects a data storage location (e.g., data storage location 406 or data storage location 407) from a plurality of data storage locations in the environment 400 based on the zone of interest determined at step 605. In embodiments, the storage server 402 selects the data storage location based on how close the data storage location is to the zone of interest. In one example, the zone of interest is Zone 1 of FIG. 4, and the data storage location selected at step 607 is the data storage location 406 within Zone 1. In another example, the zone of interest is Zone 2 of FIG. 4, and the data storage location selected at step 607 is the data storage location 407 within Zone 2. In embodiments, the access module 411 of the storage server 402 implements step 607.

At step 608, the storage server 402 sends the request to the selected data storage location to create the cloud storage bucket in the zone of interest. In embodiments, the request to create the cloud storage bucket includes instructions for automatically initiating the storage features or functions determined at step 601. For example, the request may include instructions to turn on WORM storage features for legal data. The storage server 402 may comprise the selected data storage location, or the data storage location may be a remote location. In one example, the access module 411 of the storage server 402 determines an end point that should be handling the request to create a cloud storage bucket or processes the request locally, which ensures that the cloud storage bucket is created in the same US-EAST regions as the containerized application of interest (e.g., containerized application A). In embodiments, the access module 411 of the storage server 402 implements step 608.

At step 609, the select data storage location creates the cloud storage bucket based on the request received from the storage server 402. Tools and methods for creating cloud storage buckets may be utilized by the data storage location based on the request. In embodiments, the creation of the cloud storage bucket includes the automatic enablement of the features or functions determined at step 601 (e.g., turning on WORM storage features for legal data). In embodiments, the data storage locations 406 or 407 implement step 609.

Figure 7A:
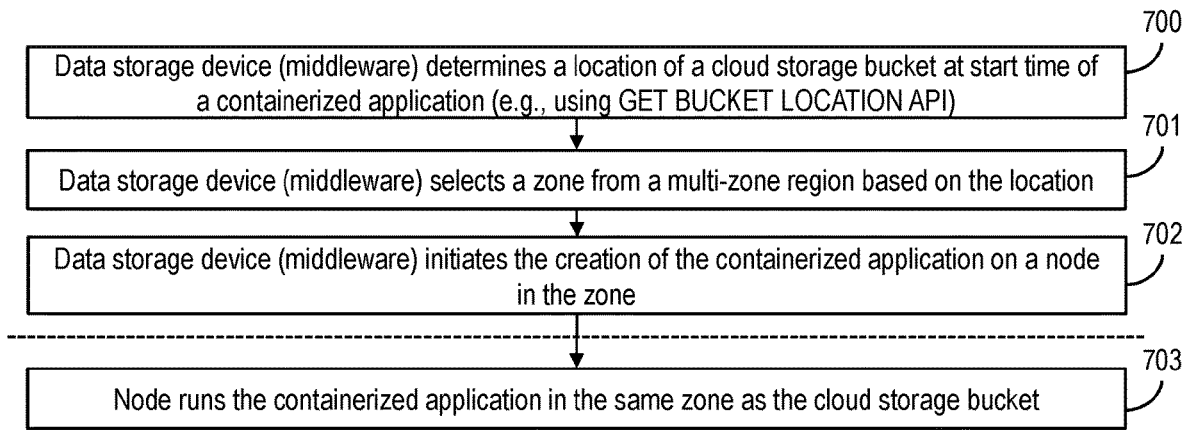
FIG. 7A shows a flowchart of an exemplary method for co-locating a containerized application with a storage bucket in accordance with aspects of the present invention.

FIG. 7A shows a flowchart of an exemplary method for co-locating a containerized application with a storage bucket in accordance with aspects of the present invention. Steps of the method may be carried out in the environment of FIG. 4 and are described with reference to elements depicted in FIG. 4. The method of FIG. 7A addresses situations where a cloud storage bucket has already been created in a zone, and an associated containerized application has not yet been created.

At step 700, the data storage device of the environment 400 (e.g., the storage server 402 or the Node 4) determines a location (e.g., Zone 1) of a cloud storage bucket (e.g., storage bucket 412) at a start time of a containerized application. In implementations, the data storage device determines the location using a GET BUCKET LOCATION API to obtain the location of the cloud storage bucket from the access module 411 (access layer). In embodiments, the middleware module 410 or 410' implements step 700.

At step 701, the data storage device of the environment 400 (e.g., the storage server 402 or the Node 4) selects a zone from a MZR based on the location determined at step 700. Step 701 can be implemented in accordance with step 501 of FIG. 5. In embodiments, the middleware module 410 or 410' implements step 701.

At step 702, the data storage device of the environment 400 (e.g., the storage server 402 or the Node 4) initiates the creation of the containerized application on a node (e.g., Node 1) in the zone selected at step 701. In embodiments, the cloud storage bucket and its associated containerized application are co-located within a predetermined or threshold distance of one another. In embodiments, the middleware module 410 or 410' implements step 701.

At step 703, the node (Node 1) runs the containerized application of interest (e.g., containerized application A) in the same zone as the existing cloud storage bucket (e.g., storage bucket 412). Thus, in accordance with FIG. 7A, the containerized application of interest is started on a node/cluster at or near the same location as that of the associated cloud storage bucket (volume).

Figure 7B:
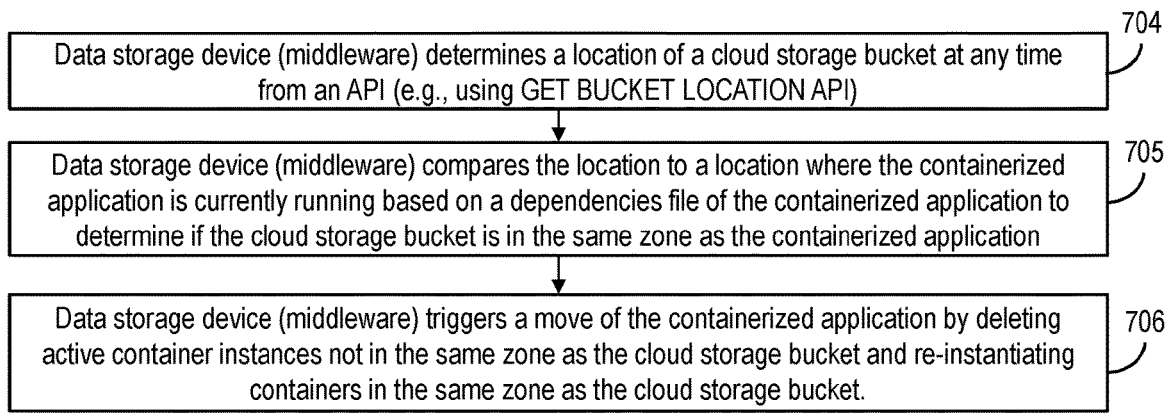
FIG. 7B shows a flowchart of an exemplary method of moving a containerized application in accordance with aspects of the present invention.

FIG. 7B shows a flowchart of an exemplary method of moving a containerized application in accordance with aspects of the present invention. Steps of the method may be carried out in the environment of FIG. 4 and are described with reference to elements depicted in FIG. 4. The method of FIG. 7B addresses situations where a cloud storage bucket and an associated containerized application have already been created but are not within the same zone or location.

At step 704, the data storage device of the environment 400 (e.g., the storage server 402 or the Node 4) determines a location of a cloud storage bucket at any time using a GET BUCKET LOCATION API to obtain the location of the cloud storage bucket from the access module 411. In embodiments, the middleware module 410 or 410' implements step 704.

At step 705, the data storage device of the environment 400 (e.g., the storage server 402 or the Node 4) compares the location determined at step 704 to a location where a containerized application of interest is currently running based on a dependencies file of the containerized application, in order to determine if the cloud storage bucket is in the same location or zone as the containerized application of interest. If the data storage device determines that the location of the cloud storage bucket matches the location of the containerized application of interest (e.g., they are in the same geographic zone), the data storage device ends this process. However, if the data storage device determines that the location of the cloud storage bucket does not match the location of the containerized application of interest (e.g., they are not in the same geographic zone), the data storage device advances to step 706. In embodiments, the middleware module 410 or 410' implements step 705.

At step 706, the data storage device of the environment 400 (e.g., the storage server 402 or the Node 4) triggers a move of the containerized application by deleting active container instances not in the same zone or location as the cloud storage bucket and re-instantiating containers in the same zone or location as the cloud storage bucket. In embodiments, the cloud storage bucket and its associated containerized application are co-located within a predetermined or threshold distance of one another. In embodiments, the middleware module 410 or 410' implements step 706.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computing device, a location of a containerized application in a data storage network, wherein the computing device is a data storage device, and the determining the location of the containerized application comprises determining, by middleware of the data storage device, a location of a node and a pod on which the containerized application is running in the data storage network;
   determining, by the computing device, that a cloud storage bucket does not yet exist in a geographic zone associated with the location of the containerized application;
   selecting, by the computing device, a data storage location for the cloud storage bucket from a plurality of data storage locations in the data storage network based on the geographic zone; and
   sending, by the computing device, a request to create the cloud storage bucket to the data storage location and causing creation and co-location of the cloud storage bucket within a predetermined distance of the containerized application.

2. The method of claim 1, wherein the determining that the cloud storage bucket does not yet exist comprises accessing data regarding existing cloud storage buckets in a dependencies file of the containerized application.

3. The method of claim 1, further comprising selecting, by the computing device, the geographic zone from a plurality of geographic zones in the data storage network based on the location of the containerized application.

4. The method of claim 1, wherein the determining the location of the containerized application comprises accessing a dependencies file of the containerized application and querying the dependencies file for the location using an application program interface (API).

5. The method of claim 1, further comprising:
   determining, by the data storage device, a type of the containerized application or data of the containerized application; and
   determining, by the data storage device, features or functions associated with the type of the containerized application or the data of the containerized application, wherein the request to create the cloud storage bucket includes instructions for the data storage location to automatically initiate the features or functions.

6. The method of claim 1, wherein the data storage device is a storage server, and the method further comprises determining, by an access layer of the storage server, a location of a source of an original request to create the cloud storage bucket received by the storage server.

7. The method of claim 6, wherein the determining the location of the source is based on an Internet Protocol (IP) address of the original request to create the cloud storage bucket.

8. The method of claim 6, wherein the original request to create the cloud storage bucket includes instructions for automatically enabling features or functions associated with a type of the containerized application or data of the containerized application.

9. The method of claim 1, wherein the computing device includes software provided as a service in a cloud environment.

10. A system comprising:
    a processor, a computer readable memory, one or more computer readable storage media, and program instructions collectively stored on the one or more computer readable storage media, the program instructions executable to cause a computing device to:
    determine a location of a containerized application in a data storage network, wherein the computing device is a data storage device, and the determining the location of the containerized application comprises determining, by middleware of the data storage device, a location of a node and a pod on which the containerized application is running in the data storage network;
    determine that a cloud storage bucket does not yet exist in a geographic zone associated with the location of the containerized application;
    select a data storage location for the cloud storage bucket from a plurality of data storage locations in the data storage network based on the geographic zone; and
    send a request to create the cloud storage bucket to the data storage location and causing the creation and co-location of the cloud storage bucket within a pre-determined distance of the containerized application, wherein the request includes instructions for automatically enabling features or functions associated with a type of the containerized application.

11. The system of claim 10, wherein the determining that the cloud storage bucket does not yet exist comprises accessing data regarding existing cloud storage buckets in a dependencies file of the containerized application.

12. The system of claim 10, wherein the program instructions are further executable to select the geographic zone from a plurality of geographic zones in the data storage network based on the location of the containerized application.

13. The system of claim 10, wherein the determining the location of the containerized application comprises accessing a dependencies file of the containerized application and querying the dependencies filed for the location using an application program interface (API).

14. The system of claim 10, wherein the program instructions are further executable to:
    determine a type of the containerized application; and
    determine the features or functions associated with the type of the containerized application.

15. The system of claim 10, wherein the data storage device is a storage server, and the method further comprises determining, by an access layer of the storage server, a location of a source of an original request to create the cloud storage bucket received by the storage server.

16. The system of claim 15, wherein the determining the location of the source is based on the Internet Protocol (IP) address of the original request to create the cloud storage bucket.

* * * * *